Nov. 18, 1958 G. D. HENDRICKS 2,861,137

HIGH GAIN AMPLIFIERS WITH INTERCHANGEABLE UNITS

Filed July 21, 1954

INVENTOR.
G. DONALD HENDRICKS
BY Bruno C. Lechler
ATTORNEY

United States Patent Office 2,861,137

Patented Nov. 18, 1958

2,861,137

HIGH GAIN AMPLIFIERS WITH INTERCHANGEABLE UNITS

George Donald Hendricks, Campbell's Island, Ill., assignor to Eagle Signal Corporation, Moline, Ill., a corporation of Massachusetts Application July 21, 1954, Serial No. 444,874

1 Claim. (Cl. 179—171)

The invention relates to a high gain amplifier having a number of units which are mounted on a chassis in a manner adapted to screen waves that are fed to the device, screening out those waves that fall outside of a given wave band, and amplifying those waves that fall within the band, and finally causing a relay to respond to those waves that have been received, screened, and amplified.

Such amplifiers may be used in connection with a wide variety of devices that detect, or create, minute currents. The components of the amplifier must be selected to fit the particular characteristics of the current received and the requirements of the apparatus which responds to the amplifier.

Since the proper functioning of each amplifier depends on the proper related functioning of a number of tubes, condensers, and resistors, considerable difficulty is often experienced in locating the trouble in an installed amplifier if it ceases to function, or in making the changes that will adapt an amplifier carried in stock to a particular use.

If the novel stock amplifier, covered by this invention, is to be used to amplify a particular wave band, all those elements that have to be selected and combined to adapt the unit to amplify that particular wave band are built into a particular group, the entire group mounted in a unit or capsule with all the elements interconnected, the capsule provided with prongs so that to adapt the amplifier to a new use the group as a whole may be unplugged from the amplifier chassis and replaced by another group mounted in a similar capsule that is adapted to the amplification to be performed.

Similarly, all those elements that must be adapted to the amount of the current to be amplified are placed in another group and the elements in that group so interconnected and placed in a capsule that the entire group can be plugged into the amplifier chassis or removed if the amplifier application calls for a group having different characteristics.

The invention has the further advantage that if an amplifier breaks down, the time consuming and highly skilled search for that one of a myriad of condensers, resistors or connections at fault is eliminated. A duplicate unit, containing all the elements of the group, is substituted for one of the units in the amplifier. If the amplifier still does not function, a similar substitution of some other one of the units is made and this procedure carried on until the amplifier functions.

To put the amplifier back in service is no more complicated than replacing a lamp bulb in a lamp at home.

In the illustration shown herein each group of elements may be mounted in a metal capsule that has a standard 8 prong plug that fits into a standard socket. Each socket is provided with a key aligning the plug relative to the socket so that only a particular prong on the plug can enter a particular hole in the socket.

The invention is not limited to combining the elements forming the amplifier in such a way that the elements whose size or capacity is related to a particular use of the amplifier are in one capsule, so that the elements may be readily replaced as a unit. The invention further contemplates arranging the connection of the elements in the capsule to the respective prongs in such a way that if a number of capsules A, B, C, D each containing an entirely different group of elements and respectively intended to be placed in sockets AA, BB, CC, DD are accidentally plugged into the wrong sockets, no damage results. If plug A instead of being placed in socket AA is plugged into one of the other sockets BB, CC, DD, thus making connections that were not contemplated, no damage results.

This may be done by using standard plugs and sockets. Each plug is oriented in the socket and the plug has more prongs than are needed in connecting one capsule to the circuits in the chassis through the socket.

This permits selecting particular prongs and particular contacts in the socket to connect the devices in one capsule to the circuits in the chassis, and other prongs and other contacts in other sockets to connect the different devices in another capsule to the circuits in the chassis.

The wrong plug in the wrong socket will not complete circuits and thus prevent injury to apparatus designed for low voltage by high voltage current.

In this manner an amplifier is provided than can be manufactured in quantity and adapted to a variety of uses simply by placing the proper capsules in the sockets.

The object of the invention is to provide an amplifier comprising a standard chassis carrying a number of plugged in units that can be replaced or substituted to meet changing requirements.

A further object is to provide a high amplification unit which can readily be serviced, because all of the elements that might fail are grouped in replaceable capsules.

A further object of the invention is to provide a high magnification amplifier consisting of a chassis and a number of standard sockets with the capsules provided with plugs fitting any one of these sockets but the connections from the capsule to the prongs arranged so that if the wrong capsule is put in a socket, no damage will result.

Figure 5:
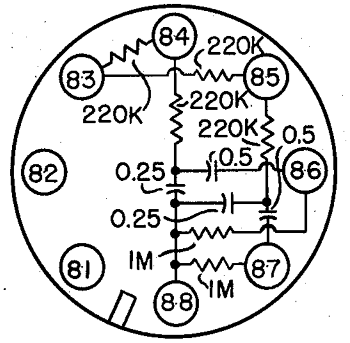
Figures 1, 2:
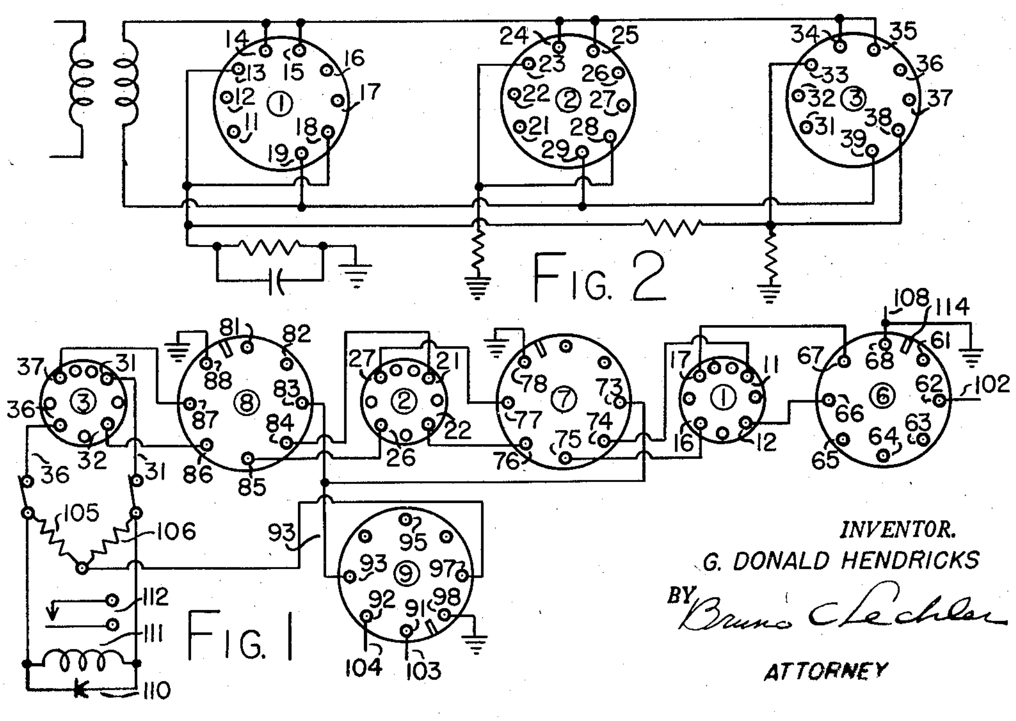
Figure 1 shows a number of sockets in an amplifier chassis and the various connections over which the current to be amplified is received and led into one unit and then carried out of said unit to another unit until finally the amplified current leaves from the last socket.
Figure 2 shows the same sockets and the heater circuits for the twin triode tubes, the cathode returns, and the inverse feed back.

Figure 5 similarly shows, diagrammatically, the coupling unit fitting into socket 8 in Figure 1.

Figure 6:
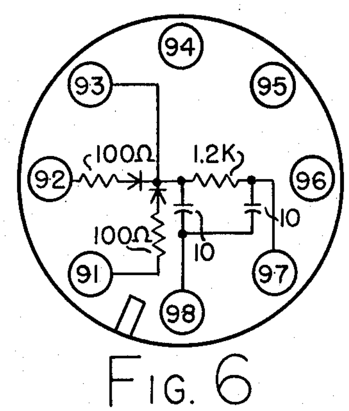

Figure 6 similarly shows, diagrammatically, the unit fitting into socket 9 in Figure 1.

The faint current to be amplified is brought in through a circuit consisting of lines 102, 108 on the right side of Figure 1 that lead to terminals 62, 68 of 6 which is one of four sockets 6, 7, 8, 9 on the chassis. The chassis also has three additional sockets of a different size 1, 2, 3 for twin triode tubes. Apparatus to be described in more detail later is contained in capsules that fit into sockets 6, 7, 8, 9.

Alternating current to power the amplifier is supplied through lines 103, 104 to terminals 91, 92 of socket 9. The capsule that fits into socket 9, shown in Figure 6, is essentially a rectifier and it feeds direct current over terminal 93 in the socket to terminal 83 on socket 8 and terminal 73 on socket 7. Terminal 98 on the socket is connected to ground. Terminal 97 feeds D. C. over resistors 105, 106 to terminals 36 and 31 of socket 3.

Figure 3:
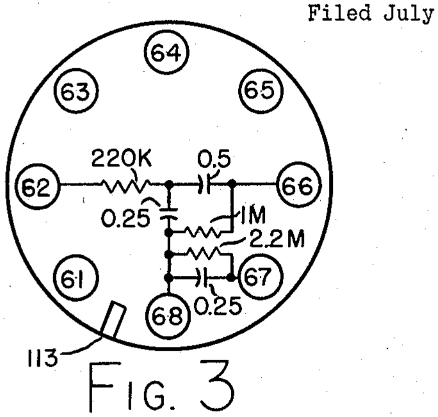
Figure 3 shows, diagrammatically, the input unit fitting into socket 6 in the chassis shown in Figure 1. Each prong on the unit bears the same number as the hole in the socket into which that prong is intended to enter.

An incoming signal reaching socket 6 through terminals 62, 68 enters the input capsule shown in Figure 3 fitted into that socket where undesired wave lengths are eliminated and the waves that are retained are reshaped. The modified signal is sent out over terminals 66, 67 to grid terminals 12, 17 of tube socket 1 which has terminals 11–19 inclusive. Through plate terminals 11 and 16 of this socket 1, the current, amplified by the tube in socket 1, is sent to the terminals 74, 75 of interstage socket 7. Terminals 68 which connects with incoming line 108 is also grounded.

Figure 4:
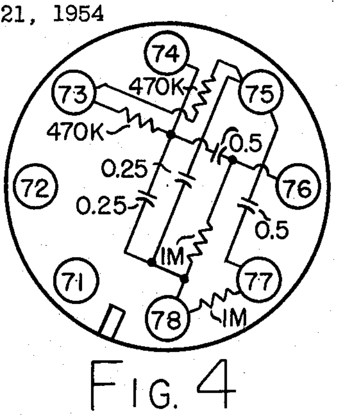
Figure 4 shows, diagrammatically, the interstage unit fitting into socket 7 in Figure 1. Here also, each prong bears the same number as the hole in the socket into which that prong is intended to enter.

In the interstage capsule plugged into socket 7 shown in Figure 4 terminal 78 is grounded. The terminal 73 is supplied with power from socket 9 as described. The amplified current received from socket 1 is again freed from undesired wave lengths and is sent out through terminals 76, 77 to grid terminals 22, 27 of tube socket 2 which has terminals 21–29. The current further amplified in tube 2 is sent out over terminals 21, 26 to terminals 84, 85 on the coupling unit socket 8. Terminal 88 is grounded and terminal 83 is supplied with D. C. current from terminal 93 on socket 9.

The current, modified and again freed of undesired wave lengths in the coupling unit capsule fitted into socket 8 and shown in Figure 5 is sent out from terminals 86, 87 to grid terminals 32, 37 of the tube socket 3. This socket has terminals 31–39. The amplified current is sent out from plate terminals 31, 36 of socket 3. The lines leading out from terminals 31, 36 may lead to a rectifier 110 in parallel with a relay coil 111 that may actuate switch 112 in some circuit not shown that is to respond to the amplified current. The amplified current could of course be utilized in some other manner than in closing a switch 112.

While the amplification is shown here as comprising three steps, there may be more or less than three steps.

Each of the capsules, such as the one shown diagrammatically in Figure 3, carries an element such as key 113, and each of the standard sockets such as that shown at 6 in Figure 1 carries an element such as slot 114, and the two elements 113 and 114 must be aligned with each other before the capsule can be placed in the socket, thus orienting the capsule in its socket. However, since the sockets are standard sockets, a capsule, such as that shown in Figure 3 and intended to be placed in the socket 6, could by error be entered in any one of the sockets shown at 7, 8, 9.

The capsule shown in Figure 3 contains resistors and condensers arranged in the familiar manner to eliminate waves falling outside of a desired wave band. Since the functioning of the amplifier depends on the correct proportioning of the various elements used, the capacities of the various elements used in one actual application of the invention are shown. In this typical application, used by way of illustration, waves within a wave band of 2 to 30 C. P. S. are to be amplified and waves outside this wave band are to be suppressed. The signal received has voltages of the order of only .005 volt and is to be amplified to a current of the order of 5 ma. having a voltage of the order of 35 volts.

The condenser sizes are indicated in microfarads.

The size of resistors is indicated in the following manner; M indicates megohms, K kilohms.

The units shown in Figures 3, 4, 5 and 6 are plug-ins that contain the necessary electronic components selected to function according to a design that is intended to amplify a particular current to a particular degree.

Figure 3 shows all the components that form an input unit. This capsule has prongs 61 to 68 inclusive and contains grid leak resistors and by-pass condensers connected so that tube number 1 will act as a phase-splitter to permit the apparatus to function as a push-pull, or double ended, amplifier.

Figure 4 which has prongs 71 to 78 is an interstage coupling unit serving two purposes. It provides B plus voltage to the twin-triode tube No. 1 and couples the amplified signal to vacuum tube No. 2. This is accomplished by feeding D. C. current in at terminal 73 through the 470K load resistor to terminals 74, 75 and thus to plates 11 and 16 of tube No. 1. Two .05 mfd. coupling condensers are provided to feed the split signal to terminals 76, 77 thence to grids 22 and 27 of tube No. 2. Grid leak resistors of 1M each are provided within the plugged in unit shown in Figure 4 and these resistors are grounded through terminal 78. It will be noted that in this interstage unit 1.25 microfarad by-pass condensers are provided for the plate circuit of tube No. 1.

Figure 5 shows a coupling unit functioning in much the same manner as the interstage coupling unit shown in Figure 4 and having prongs 81 to 88 inclusive. This unit also decouples by a network of 220K resistors in conjunction with 0.5 grid condensers and .25 by-pass condensers. The unit therefore provides plate power for tube No. 2 at terminals 21 and 26 of that tube and also a coupling means for the amplified signal to the grids at tube No. 3 through terminals 32, 37.

Figure 6 shows a full wave rectifier having prongs 90–98 in which A. C. current is fed in through terminals 91—92 and rectified through selenium rectifiers provided with 100 ohm current limiting resistors.

The rectified D. C. output is filtered through a standard pi-network consisting of a 1200 ohm resistor in conjunction with a dual 10 mfd. filter condenser. Two sources of D. C. are provided at terminals 93, 97. The source 93 is used to feed output tube No. 3 through the desired coupling means or load, in this case load resistors 105, 106, and associated relay No. 111. Source 93 is used to provide plate voltage for tubes 1—2 through plug-in units No. 8, Figure 5, and No. 7, Figure 4, as previously described.

In the operation of this unit, for example in connection with a detector that generates a faint current on the passage of an object, the faint A. C. waves are fed through a potentiometer that brings the amplitude of the signals within a desired range to lines 102 leading into terminal 62 of socket 6.

The capsule shown in Figure 3 shapes the wave, eliminating undesired frequencies and feeds current out through terminals 66 and 67 to the grids of the first duo triode tube, terminals 12 and 17. This tube, energized through plate terminals 11 and 16, functions as a phase invertor and sends an amplified signal to the capsule shown in Figure 4 by modulating the current in the lines leading to terminals 74, 75. The interstage capsule, Figure 4, transmits through the circuits shown the amplified signal to the second dual triode tube 2 where, in the same manner as described in connection with the duo triode 1, the current is amplified and passed on to interstage coupling 8.

This coupling, shown in Figure 5, provides decoupling, using power received from rectifier stage 91, passes the amplified signal from tube No. 2 to the grids of duo triode No. 3.

Tube No. 3 receives its plate voltage through load resistors 105, 106. The signal through this network will vary as the grid signals swing alternately negative and positive. The amplified signal swing in the amplifier shown is permitted to flow in one direction only by rectifier 110 thus energizing relay 111 closing contact 112 to perform a work function each time a detected signal is fed into line 102—108.

The key 113 on capsule 6 shown in Figure 3 would allow it to be slipped by error into any one of the sockets 7, 8, 9 for which it is not designed.

However no injury would result because the prong 68, intended to be grounded would strike ground at either 78, 88 or 98. But one of the three remaining prongs that are active in capsule 6—that is 62, 66, 67—would fail to complete the circuit in any other socket. Thus if capsule 6 is placed in sockets 7 or 8, 62 makes no connection at 72 or 82. If placed in socket 9, 66 makes no connection at 96.

In similar manner if any one of the other three capsules 7, 8, 9 is inserted in the wrong socket, it will be found that same prong must be energized through the socket to make the capsule function will not be energized.

I claim:

In a traffic detector amplifier, a chassis, two input terminals, two power terminals, and three output terminals all mounted thereon, three nine-pin tube sockets mounted thereon, four eight-pin component sockets mounted thereon, a double triode vacuum tube mounted in each tube socket each containing two control grids, two cathodes, two anodes, and a cathode heater element, a first encapsulated filter network to receive signals from said input terminals and to pass to the grids of first said triode only those signals whose wave length is substantially 2 to 30 cycles per second, a second encapsulated coupling network containing an anode power supply and filter circuit to receive signals from said anodes of first said triode and apply said signals to said grids of second said double triode, a third encapsulated coupling network containing an anode power supply and filter circuit to receive said signals from said anodes of second said triode and apply said signals to said grids of third said double triode, a final stage including two plate resistors, a relay coil, a rectifier, and said two output terminals all in parallel, a fourth encapsulated network including power rectifiers and filter network the output of which is connected to the same numbered receptacle in each component socket, a power supply transformer connected to said power terminals the output of which is connected to two same numbered receptacles in each component socket, and a ground connection made to an identically numbered receptacle in each component socket.

References Cited in the file of this patent

UNITED STATES PATENTS

| | | |
|---|---|---|
| 2,111,397 | Holmes | Mar. 15, 1938 |
| 2,519,415 | Thomas | Aug. 22, 1950 |
| 2,560,320 | Winkler | July 10, 1951 |
| 2,614,157 | Montgomery | Oct. 14, 1952 |